Aug. 2, 1960  F. S. DOOLITTLE  2,947,562
FISH SPEAR
Filed March 16, 1956  2 Sheets-Sheet 1

INVENTOR.
Frederick S. Doolittle
BY John P. Murphy
Attorney

Aug. 2, 1960 F. S. DOOLITTLE 2,947,562
FISH SPEAR

Filed March 16, 1956 2 Sheets-Sheet 2

INVENTOR.
Frederick S. Doolittle
BY John P. Murphy

Attorney

2,947,562
FISH SPEAR

Frederick S. Doolittle, Richfield Springs, N.Y., assignor to The Shurkatch Fishing Tackle Co., Inc., Richfield Springs, N.Y., a corporation of New York Filed Mar. 16, 1956, Ser. No. 571,904

2 Claims. (Cl. 294—61)

The present invention relates to a fish spear and especially to a fish spear of improved construction whereby a joint socket spear assembly renders the spear substantially indestructible for the intended purpose.

Heretofore, fish spears, when assembled in the conventional manner, i.e., welding the spear head to a socket, or joining the spear head to a threaded joint, proved to have a tendency to be weak at the point where the spear head is welded to the socket or where the spear head is affixed, by thread, or other such means. Oftentimes, the pressure forcibly applied at this point during use, was too great, inasmuch as the spear structure snapped at this point. It was then necessary to remove the old welds, and reweld the spear head members again to the axis. This involved several operations which were time consuming and proved to be relatively expensive.

It is an object of this present invention to provide a spear head assembly whereby the spear head is securely welded inside a joint socket having a milling cut therein, so that the extension formed by the milling cut overlaps the outside diameter of the spear head extension and acts as an extra support in addition to the weld formed therein.

Another object of this invention is to provide a milling cut extension in the socket which will encircle the outside diameter of the weld joint of the spear tines, thus reinforcing the joint and acting as a bracing support so that when pressure is applied at this point, there is little, if any, chance of it breaking.

This novel mounting device for spear heads also provides an easier means of attaching a spear head to a socket, assuring the user a securely welded spear assembly that will not strain under imposed pressure, as did the old-type assembled spears.

With the foregoing in mind, it will become readily apparent that the present invention possesses further objects and advantages, all of which will be clearly revealed during the course of the following description illustrated throughout the accompanying drawings, and more fully pointed out in the appended claims.

Figure 1:
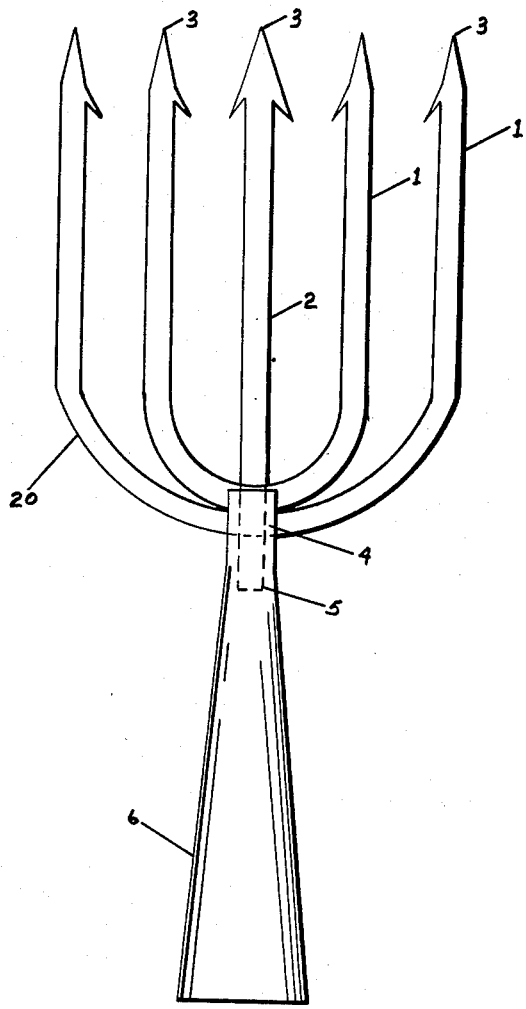
Figure 1 is a front plan view of the fish spear assembly illustrating the position of the socket extensions with regard to the joint of the spear tines.

Referring now to the drawings, and especially to Figure 1, the spear head represented as a whole by the reference character 20, comprises two or more U-shaped tines 1, laid across a straight tine 2 having an extension 5, with the spear points 3 lying in the same plane and a welded joint 4 located where the U-shaped tines 1 cross the straight tine 2. This weld joint 4 may be formed in the usual way by pressure welding, so that the U-shaped tines 1 with the straight tine 2 form a single joint 4, that is, they are welded together.

Figure 2:
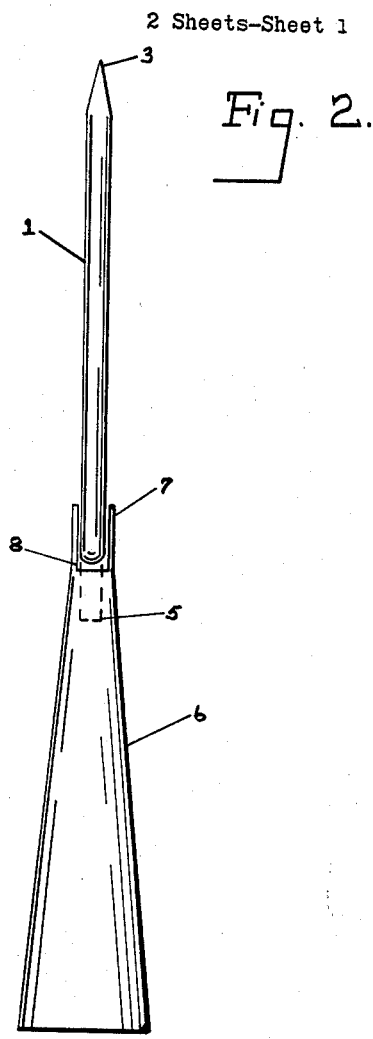
Figure 2 is a side elevation of Figure 1.
Figure 3:
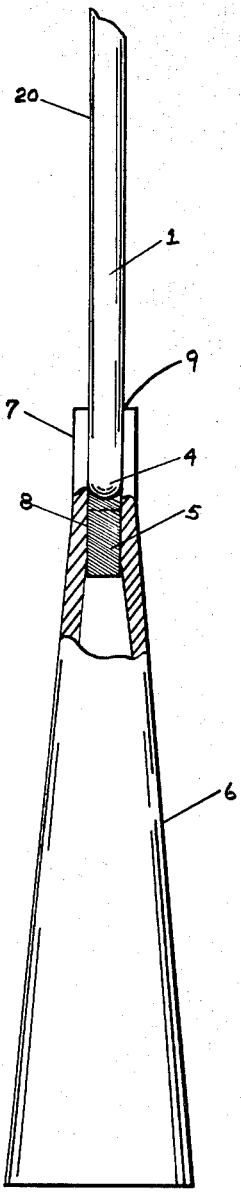
Figure 3 is an enlarged side view, in cross section, and with parts broken away, illustrating the closely fitting weld assembly retained and held in position by the socket extensions partly encircling the outer diameter of the joint.

In Figures 2 and 3 it will become apparent that the pressure welding of the tines 1 and 2 at joint 4 causes the tines 1 and 2 to be compressed together so that their combined thickness at joint 4 is substantially the same as the thickness of a single tine.

As further illustrated in the drawings, the socket 6, which is made of any suitable material, is a rotary swaged socket having a milling cut, represented by the reference character 8, which forms the milling cut extensions 7 at the upper portion of the socket 6 where the joint 4 and the extension 5 will enter, as will be later explained. The interior of the rotary swaged socket 6 is conical. When the milling cut 8 is made, the interior surface of the milling cut extensions 7 will be cylindrically shaped, as the extensions 7 lie substantially parallel to each other.

As seen in the drawings, and with particular reference to Figure 3, the joint 4 of the spear head 20 and the straight tine extension 5 are placed in the opening, represented by the reference character 9, formed by the mill cut 8 in the socket 6. The opening 9 is determined by the size of the joint 4, so that the inner surfaces of the mill cut extensions 7 are adaptable to the outside diameter of the joint 4. In this manner, the mill cut extensions 7 are in a closely fitting relationship with respect to the joint 4. As is readily seen, the extension 5 extends downwardly beyond the mill cut 8 into the socket 6.

When the spear head 20 is in position, as shown in Figures 1 and 2, the joint 4 is located between the mill cut extensions 7 with the extensions 7 acting as bracing supports on the front and back of the joint 4, and the straight tine extension 5 is entered inwardly into the socket 6, and a weld is formed thereon. In this way, the joint 4 is reinforced and the support for the tines is welded along with the tines, thus forming a unitary assembly which eliminates all joints and other points of weakness heretofore formed and found in such spears.

The welding of the joint 4 located in the opening 9 and encased by the mill cut extensions 7, to the extensions 7, forms a rigid connection of the spear head 20 to the socket 6 and avoids deformities and breakage especially at this particular point.

The mill cut 8 in the socket 6 may vary according to need, that is, the size of the cut 8 is to be determined by the size of the joint 4.

This novel mounting assembly in a fish spear may be used on large, as well as small spears without losing any structural advantages or stability.

It is to be understood that changes in detail may be made without departing from the spirit or the scope of my invention as hereinabove disclosed and from the appended claims.

I claim:

1. A spear head comprising at least one U-shaped tine having a bight portion, a straight tine disposed transversely of the bight portion of said U-shaped tine and fixedly secured in coplanar relation thereat, a socket element having a tubular open end portion having a cross section conforming to that of said straight tine, a transverse slotted portion extending across the tubular open end portion, said bight portion of said U-shaped tine being disposed in said transverse slotted portion and the terminal end of said straight tine being disposed in the open ended socket portion with portions of said slotted socket portion being disposed longitudinally on opposite intermediate side portions of said straight tine, and means fixedly securing said tines and socket element in assembled relation.

2. The structure of claim 1; said straight tine and socket element having a circular cross section.

References Cited in the file of this patent

UNITED STATES PATENTS

| | | |
|---|---|---|
| 113,212 | Sheble | Mar. 28, 1871 |
| 121,983 | Beebe | Dec. 19, 1871 |
| 180,041 | Kretsinger | July 18, 1876 |
| 787,742 | Eigen | Apr. 18, 1905 |
| 797,844 | Doolittle | Aug. 22, 1905 |
| 940,903 | Sparks | Nov. 23, 1909 |
| 1,254,041 | Hoel | Jan. 22, 1918 |
| 1,456,455 | Luukkonen | May 22, 1923 |
| 1,958,757 | Klingler | May 15, 1934 |
| 2,056,217 | Stout | Oct. 6, 1936 |
| 2,252,114 | Brown | Aug. 12, 1941 |
| 2,510,641 | Koscher | June 6, 1950 |
| 2,518,432 | Wotring | Aug. 8, 1950 |

FOREIGN PATENTS

| | | |
|---|---|---|
| 885,240 | Germany | Aug. 3, 1953 |